United States Patent
Huang

(10) Patent No.: US 10,621,928 B2
(45) Date of Patent: Apr. 14, 2020

(54) GATE-ON VOLTAGE GENERATOR OF LIQUID CRYSTAL DISPLAY DEVICE

(71) Applicant: Shenzhen China Star Optoelectronics Technology Co., Ltd., Shenzhen (CN)

(72) Inventor: Xiaoyu Huang, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/327,320

(22) PCT Filed: Dec. 22, 2016

(86) PCT No.: PCT/CN2016/111513
§ 371 (c)(1),
(2) Date: Apr. 30, 2018

(87) PCT Pub. No.: WO2018/040405
PCT Pub. Date: Mar. 8, 2018

(65) Prior Publication Data
US 2018/0268764 A1    Sep. 20, 2018

(30) Foreign Application Priority Data

Aug. 31, 2016   (CN) .......................... 2016 1 0791415

(51) Int. Cl.
*G09G 3/36*       (2006.01)
*G02F 1/133*     (2006.01)
*G02F 1/1345*   (2006.01)

(52) U.S. Cl.
CPC ............ *G09G 3/36* (2013.01); *G02F 1/13306* (2013.01); *G02F 1/13454* (2013.01); *G09G 3/3674* (2013.01); *G09G 3/3696* (2013.01); *G09G 2310/0243* (2013.01); *G09G 2310/0264* (2013.01)

(58) Field of Classification Search
CPC combination set(s) only.
See application file for complete search history.

(56) References Cited

U.S. PATENT DOCUMENTS 7,847,718 B2    12/2010  Ishii et al.
2007/0126689 A1*  6/2007  Ishii ..................... G09G 3/2011
                                                                   345/100
(Continued)

FOREIGN PATENT DOCUMENTS

CN         1980068         6/2007
CN       105513549         4/2016
(Continued)

*Primary Examiner* — Deeprose Subedi

(57) ABSTRACT

Disclosed is a gate-on voltage generator of a liquid crystal display device, which is arranged in a fan-out area of an array substrate of the liquid crystal display device and includes a voltage setting unit and a gating unit. The voltage setting unit receives a gate voltage signal generated by a driver control circuit and generates gate-on voltages of various voltage values. The gating unit outputs a corresponding gate-on voltage in accordance with a gating signal generated by the driver control circuit. By means of the gate-on voltage generator of the liquid crystal display device, the gate-on voltage is adjustable, and product development efficiency is enhanced.

5 Claims, 2 Drawing Sheets

(56) References Cited

U.S. PATENT DOCUMENTS

2008/0079701 A1   4/2008  Shin et al.
2014/0118324 A1*  5/2014  Chan .................. G09G 3/3677
                                                    345/212

FOREIGN PATENT DOCUMENTS

| CN | 105513549 A  | 4/2016  |
|----|--------------|---------|
| CN | 106157913    | 11/2016 |
| CN | 106157913 A  | 11/2016 |
| JP | 2002-99252   | 4/2002  |
| JP | 2002099252 A | 4/2002  |
| KR | 20070002530 A| 1/2007  |
| KR | 1020070002530| 1/2007  |

* cited by examiner

GATE-ON VOLTAGE GENERATOR OF LIQUID CRYSTAL DISPLAY DEVICE

CROSS-REFERENCE TO RELATED APPLICATIONS

This application claims the priority of Chinese patent application CN201610791415.4, entitled "Gate-on voltage generator of liquid crystal display device" and filed on Aug. 31, 2016, the entirety of which is incorporated herein by reference.

FIELD OF THE INVENTION

The present disclosure relates to the technical field of driving of display devices, and in particular, to a gate-on voltage generator of a liquid crystal display device.

BACKGROUND OF THE INVENTION

Thin film transistor liquid crystal display (TFT LCD) devices are one of main types of flat panel display devices at the present time, and have become an important display platform for modern IT and video products.

The main driving principle of a TFT LCD device is as follows. The main board of the system connects R/G/B compressed signals, control signals, and power to a connector on a printed circuit board (PCB) via wires. After being processed by a timing controller (TCON) chip on the printed circuit board, data is connected to the display area on the display panel via the printed circuit board, a source-chip on film (S-COF) circuit and a gate-chip on film (G-COF) circuit, so that the liquid crystal display device obtains required power supply and signals. This is shown in FIG. 1.

In order to achieve turn-on of the gate, it is required to provide a gate-on voltage VGH for the gate-chip on film circuit. However, in the prior art, the gate-on voltage VGH is unchangeable after its design is completed. If the gate-on voltage VGH needs to be changed in a subsequent process, it has to be achieved by providing an external voltage or changing the design scheme.

Thus, there is an urgent need to provide a solution for changing the numerical value of the gate-on voltage in order to solve the above problem.

SUMMARY OF THE INVENTION

The technical problem to be solved by the present disclosure is how to provide a solution for changing the numerical value of a gate-on voltage.

In order to solve the above technical problem, a gate-on voltage generator of a liquid crystal display device is provided in embodiments of the present application. The gate-on voltage generator of the liquid crystal display device is arranged in a fan-out area of an array substrate of the liquid crystal display device, and comprises a voltage setting unit and a gating unit. The voltage setting unit is configured to receive a gate voltage signal generated by a driver control circuit and generate gate-on voltages of various voltage values. The gating unit is connected to the voltage setting unit, and is configured to receive the gate-on voltages of various voltage values and meanwhile receive a gating signal generated by the driver control circuit and then output a corresponding gate-on voltage in accordance with the gating signal. The driver control circuit is arranged on a printed circuit board which is connected to the array substrate of the liquid crystal display device via a flexible circuit board.

Preferably, the gating signal includes a plurality of switch signals.

Preferably, the gating unit includes a plurality of switch elements arranged in a switch matrix.

Preferably, the switch elements include P-type thin film transistors and N-type thin film transistors.

Preferably, gates of respective thin film transistors located in a same row of the switch matrix are configured to receive a same switch signal, and are switched on or off under the control of the switch signal. Sources and drains of respective thin film transistors located in a same column of the switch matrix are connected in series following a predetermined order, and a corresponding gate-on voltage is output when respective thin film transistors located in the same column are all switched on.

Preferably, sources of respective thin film transistors located in a last row of the switch matrix are coupled together, and the switch matrix is configured to output only one gate-on voltage under the control of the switch signals at any time.

Preferably, a series connection order of the respective thin film transistors located in a same column of the switch matrix is determined by electric level states of the switch signals.

Preferably, the voltage setting unit includes a resistor matrix, and different voltage dividing nodes in the resistor matrix are used to generate gate-on voltages of various voltage values in accordance with the received gate voltage signal.

Preferably, a value of the gate voltage signal is greater than or equal to a maximum value of the gate-on voltage required by the array substrate.

Preferably, the resistor matrix includes a plurality of resistors in series connection between the gate voltage signal and a signal ground on the array substrate, and a voltage on a voltage dividing node between any two resistors, including the gate voltage signal, is taken as the gate-on voltage.

Compared with the prior art, one or more embodiments of the above solution can have the following advantages or achieve the following beneficial effects.

Adjustment of the gate-on voltage is achieved by arranging the voltage setting unit and the gating unit in the fan-out area of the array substrate of the liquid crystal display device, which enhances general applicability of the design of the liquid crystal display device and improves product development efficiency.

Other advantages, objectives, and features of the present disclosure will be further explained in the following description. To some degree, other advantages, objectives, and features of the present disclosure will partly become self-evident for those skilled in the art based on a study of the following text, or teachings will be obtained from the implementation of the present disclosure. The objectives and other advantages of the present disclosure will be achieved through the structures specifically pointed out in the description, claims, and the accompanying drawings.

BRIEF DESCRIPTION OF THE DRAWINGS

The accompanying drawings are provided for better understanding the technical solutions of the present application or the prior art, and constitute one part of the description. The accompanying drawings, together with embodiments of the present application, are used for explaining the technical solutions of the present application, rather than restricting the technical solutions of the present application.

DETAILED DESCRIPTION OF THE EMBODIMENTS

The present disclosure will be explained in detail below with reference to the embodiments and the accompanying drawings, so that one can fully understand how the present disclosure solves the technical problem and achieves the technical effects through technical means, thereby implementing the same. It should be noted that as long as there is no structural conflict, any of the embodiments and any of the technical features thereof may be combined with one another, and the technical solutions obtained therefrom all fall within the scope of the present disclosure.

Figure 1:
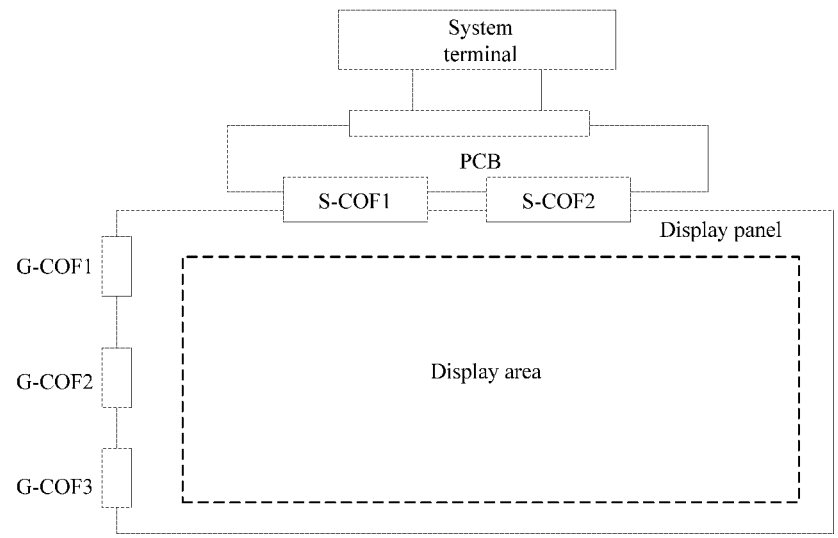
FIG. 1 schematically shows a drive architecture of a thin film transistor liquid crystal display device in the prior art.
Figure 2:
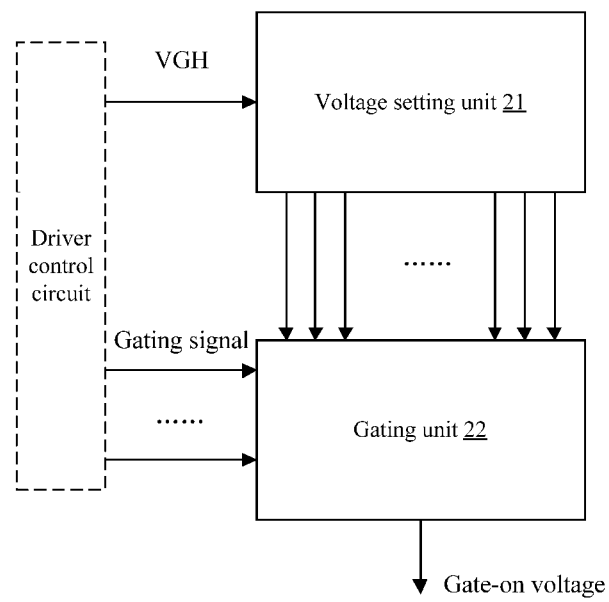
FIG. 2 schematically shows a structure of a gate-on voltage generator of the liquid crystal display device according to one embodiment of the present disclosure.

FIG. 2 schematically shows a structure of a gate-on voltage generator of a liquid crystal display device according to one embodiment of the present disclosure. As shown in FIG. 2, the gate-on voltage generator mainly comprises a voltage setting unit 21 and a gating unit 22.

Figure 3:
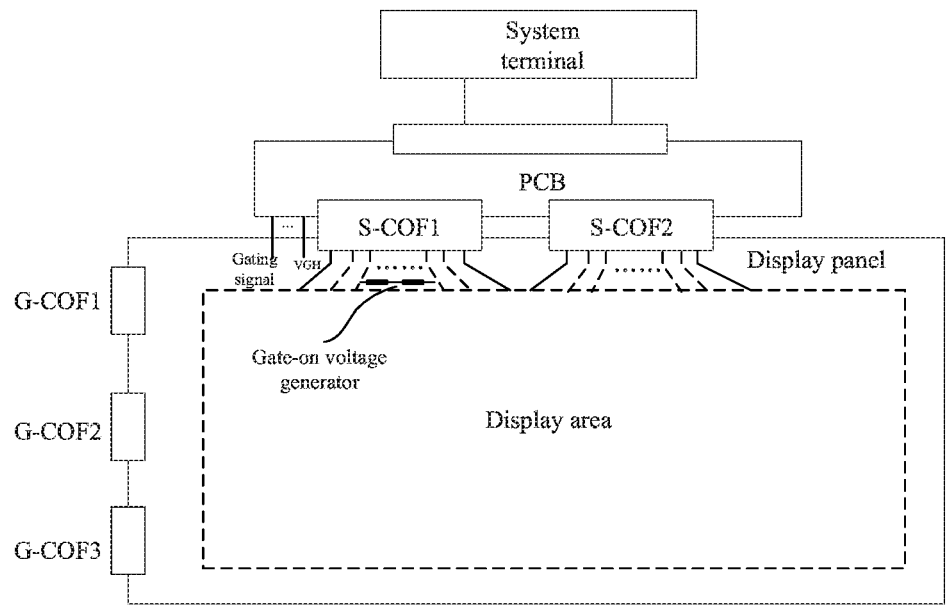
FIG. 3 schematically shows a relationship between the structure of the gate-on voltage generator of the liquid crystal display according to one embodiment of the present disclosure and the architecture of the liquid crystal display device in the prior art.

The gat-on voltage generator is arranged in a fan-out area of an array substrate of the liquid crystal display device. A gate voltage signal VGH generated by a main printed circuit board (PCB) of a system is transmitted to the fan-out area of the array substrate via a flexible circuit board. A relationship between the structure of the gate-on voltage generator of the liquid crystal display and the architecture of the liquid crystal display device in the prior art is shown in FIG. 3.

Further, the voltage setting unit 21 is configured to receive a gate voltage signal VGH from a driver control circuit and generate gate-on voltages of various voltage values.

The gating unit 22 is connected to the voltage setting unit 21, and is configured to receive the gate-on voltages of various voltage values generated by the voltage setting unit 21. Meanwhile, the gating unit 22 is configured to receive a gating signal generated by the driver control circuit and output a corresponding gate-on voltage in accordance with the gating signal.

It can be seen from FIG. 2 that the voltage setting unit 21 has a plurality of output terminals, each of which corresponds to a gate-on voltage. The gating unit 22 has a plurality of input terminals for inputting gate-on voltages received respectively.

In one embodiment of the present disclosure, the gating signal includes a plurality of switch signals. If a high electric level and a low electric level of a voltage are used to refer to two different states of each of the switch signals respectively, a plurality of high and low electric level signals can be generated by means of the driver control circuit so as to control output of the gate-on voltages of various voltage values. Finally, the purpose of changing the gate-on voltage can be achieved, and general applicability of the liquid crystal display device can thus be enhanced.

In one embodiment of the present disclosure, the gating unit 22 includes a plurality of switch elements arranged in a switch matrix. When a plurality of switch elements that are interconnected in the switch matrix are switched on at the same time, they together form a transmission channel, through which a corresponding gate-on voltage of a certain voltage value is output.

In one embodiment of the present disclosure, the switch elements forming the switch matrix are P-type thin film transistors or N-type thin film transistors. A plurality of P-type thin film transistors and N-type thin film transistors are formed in the fan-out area of the array substrate by means of an array process in manufacturing the array substrate. When a plurality of interconnected P-type thin film transistors and/or N-type thin film transistors are switched on at the same time, they together form a transmission channel, through which a corresponding gate-on voltage of a certain voltage value is output.

In one embodiment of the present disclosure, the voltage setting unit 21 is formed by a resistor matrix, and is configured to generate gate-on voltages of various voltage values by means of different voltage dividing nodes in the resistor matrix in accordance with the received gate voltage signal VGH. The resistor matrix is formed in the fan-out area of the array substrate by means of an array process in manufacturing the array substrate. The structure of the gate-on voltage generator of the liquid crystal display is further explained in detail in another embodiment.

Figure 4:
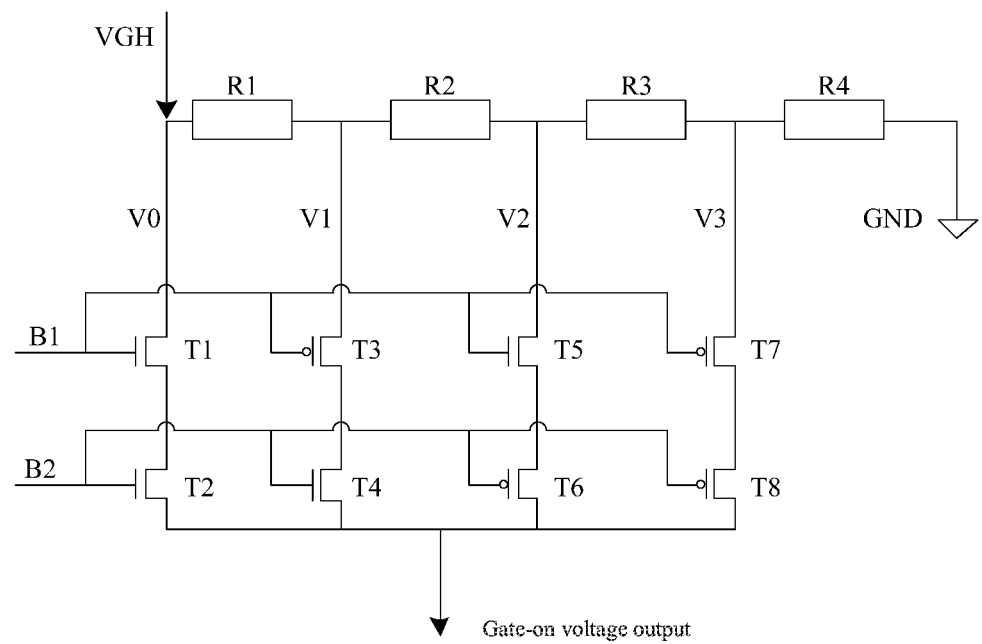
FIG. 4 schematically shows the structure of the gate-on voltage generator of the liquid crystal display according to another embodiment of the present disclosure.

FIG. 4 schematically shows the structure of the gate-on voltage generator of the liquid crystal display according to another embodiment of the present disclosure. As shown in FIG. 4, the voltage setting unit of the gate-on voltage generator includes four voltage dividing resistors: a first resistor R1, a second resistor R2, a third resistor R3, and a fourth resistor R4.

Further, the gating unit of the gate-on voltage generator includes: a first NMOS transistor T1, a second NMOS transistor T2, a third PMOS transistor T3, a fourth NMOS transistor T4, a fifth NMOS transistor T5, a sixth PMOS transistor T6, a seventh PMOS transistor T7, and an eighth PMOS transistor T8.

Relationships of connection of respective elements are as follows.

One end of the first resistor R1 is connected to a drain of the first NMOS transistor T1, and is taken as a voltage input terminal of the gate-on voltage generator.

The other end of the first resistor R1, one end of the second resistor R2, and a source of the third PMOS transistor T3 are connected to one another.

The other end of the second resistor R2, one end of the third resistor R3, and a drain of the fifth NMOS transistor T5 are connected to one another.

The other end of the third resistor R3, i one end of the fourth resistor R4, and a source of the seventh PMOS transistor T7 are connected to one another.

The other end of the fourth resistor R4 is connected to a signal ground GND.

A gate of the first NMOS transistor T1, a gate of the third PMOS transistor T3, a gate of the fifth NMOS transistor T5, and a gate of the seventh PMOS transistor T7 are connected and form an input terminal of the gate-on voltage generator for inputting a switch signal B1 of the gating signal.

A gate of the second NMOS transistor T2, a gate of the fourth NMOS transistor T4, a gate of the sixth PMOS transistor T6, and a gate of the eighth PMOS transistor T8 are connected and form an input terminal of the gate-on voltage generator for inputting another switch signal B2 of the gating signal.

A source of the first NMOS transistor T1 is connected to a drain of the second NMOS transistor T2.

A drain of the third PMOS transistor T3 is connected to a drain of the fourth NMOS transistor T4.

A source of the fifth NMOS transistor T5 is connected to a source of the sixth PMOS transistor T6.

A drain of the seventh PMOS transistor T1 is connected to a source of the eighth PMOS transistor T8.

A source of the second NMOS transistor T2, a source of the fourth NMOS transistor T4, a drain of the sixth PMOS transistor T6, and a drain of the eighth PMOS transistor T8 are connected and form a voltage output terminal of the gate-on voltage generator.

The series connection order of the above respective transistors can be determined in accordance with electric level states (which are predetermined) of the switch signals B1 and B2.

Respective resistors in series divide the voltage of the gate voltage signal VGH. If V0, V1, V2, and V3 respectively are used to refer to voltages on voltage dividing nodes between any two resistors, including the voltage of the gate voltage signal VGH, resistance values of the voltage dividing resistors can be limited by adjusting the settings of B1 and B2, and further the gate-on voltage can be changed.

Specifically, when the switch signals B1 and B2 are both adjusted to be at high electric levels, an output gate-on voltage V0 is:

$$V0 = VGH \quad (1)$$

When the switch signal B1 is adjusted to be at a low electric level and the switch signal B2 is adjusted to be at a high electric level, the output gate-on voltage V1 is:

$$V1 = VGH * \left(1 - \frac{R1}{R1 + R2 + R3 + R4}\right) \quad (2)$$

When the switch signal B1 is adjusted to be at a high electric level and the switch signal B2 is adjusted to be at a low electric level, the output gate-on voltage V2 is:

$$V2 = VGH * \left(1 - \frac{R1 + R2}{R1 + R2 + R3 + R4}\right) \quad (3)$$

When the switches B1 and B2 are both adjusted to be at low electric levels, the output gate-on voltage V3 is:

$$V3 = VGH * \left(1 - \frac{R1 + R2 + R3}{R1 + R2 + R3 + R4}\right) \quad (4)$$

Further, a value of the gate voltage signal VGH output by the driver control circuit is greater than or equal to a maximum value of the gate-on voltage required by the array substrate, for example, 33 V.

In actual application, in accordance with a resistance ratio of the first resistor R1, the second resistor R2, the second resistor R3, and the fourth resistor R4, the output gate-on voltages can be respectively set as: V0=33V, V1=30V, V2=27V, and V3=24V. Further, in accordance with actual requirements for a product, the settings of the switch signals B1 and B2 are adjusted correspondingly so as to obtain the gate-on voltage required by a panel.

In the embodiment of the present disclosure, different gate-on voltages are obtained according to different gating signals. Thus, in actual application, the output of the gate-on voltage can be changed by changing the electric levels of respective switch signals of the gating signal. Finally, the purpose of changing the gate-on voltage can be achieved, and general applicability of the liquid crystal display device can be enhanced.

The present disclosure is suitable for application in design of the drive architecture of a thin film transistor liquid crystal display device, and can dramatically improve product development efficiency.

Although embodiments of the present disclosure are provided as above, the above embodiments are described only for better understanding, rather than restricting the present disclosure. Anyone skilled in the art can make amendments to the implementing forms or details without departing from the spirit and scope of the present disclosure. However, the patent protection scope of the present disclosure should be subject to the scope defined in the claims.

The invention claimed is:

1. A gate-on voltage generator of a liquid crystal display device, wherein the gate-on voltage generator is arranged in a fan-out area of an array substrate of the liquid crystal display device, and comprises a voltage setting unit and a gating unit, wherein the voltage setting unit is configured to receive a gate voltage signal generated by a driver control circuit and generate gate-on voltages of various voltage values, and wherein the gating unit is connected to the voltage setting unit, and is configured to receive the gate-on voltages of various voltage values and meanwhile receive a gating signal generated by the driver control circuit and then output a corresponding gate-on voltage in accordance with the gating signal, wherein the driver control circuit is arranged on a printed circuit board which is connected to the array substrate of the liquid crystal display device via a flexible circuit board, wherein the gating signal includes a plurality of switch signals, wherein the gating unit includes a plurality of switch elements arranged in a switch matrix, wherein the sources of respective thin film transistors located in a last row of the switch matrix are coupled together, and the switch matrix is configured to output only one gate-on voltage under the control of the switch signals at any time, wherein a series connection order of the respective thin film transistors located in a same column of the switch matrix is determined by electric level states of the switch signals;

wherein the voltage setting unit includes a resistor matrix, wherein different voltage dividing nodes in the resistor matrix are used to generate gate-on voltages of various voltage values in accordance with the received gate voltage signal;

the resistor matrix includes a plurality of resistors in series connection between the gate voltage signal and a signal ground on the array substrate: a voltage on a voltage dividing node between any two resistors, including the gate voltage signal, is taken as the gate-on voltage;

wherein respective resistors in series divide the voltage of the gate voltage signal VGH; wherein V0, V1, V2, and V3 are respectively used to refer to voltages on voltage dividing nodes between any two resistors, and the voltages on the voltage dividing nodes comprises the voltage of the gate voltage signal VGH, resistance values of the voltage dividing resistors is limited by adjusting the settings of B1 and B2, and the gate-on voltage is able to be changed;

when the switch signals B1 and B2 are both adjusted to be at high electric levels, an output gate-on voltage V0 is:

$$V0 = VGH \quad (1);$$

when the switch signal B1 is adjusted to be at a low electric level and the switch signal B2 is adjusted to be at a high electric level, the output gate-on voltage V1 is:

$$V1 = VGH * \left(1 - \frac{R1}{R1 + R2 + R3 + R4}\right); \quad (2)$$

when the switch signal B1 is adjusted to be at a high electric level and the switch signal B2 is adjusted to be at a low electric level, the output gate-on voltage V2 is:

$$V2 = VGH * \left(1 - \frac{R1 + R2}{R1 + R2 + R3 + R4}\right); \quad (3)$$

when the switches B1 and B2 are both adjusted to be at low electric levels, the output gate-on voltage V3 is:

$$V3 = VGH * \left(1 - \frac{R1 + R2 + R3}{R1 + R2 + R3 + R4}\right); \quad (4)$$

the settings of the switch signals B1 and B2 are adjusted correspondingly so as to obtain the gate-on voltage required by a panel.

2. The gate-on voltage generator according to claim 1, wherein the switch elements include P-type thin film transistors and N-type thin film transistors.

3. The gate-on voltage generator according to claim 2, wherein gates of respective thin film transistors located in a same row of the switch matrix are configured to receive a same switch signal and are switched on or off under the control of the switch signal; and sources and drains of respective thin film transistors located in a same column of the switch matrix are connected in series following a predetermined order, and a corresponding gate-on voltage is output when respective thin film transistors located in a same column are all switched on.

4. The gate-on voltage generator according to claim 1, wherein a value of the gate voltage signal is greater than or equal to a maximum value of the gate-on voltage required by the array substrate.

5. The gate-on voltage generator according to claim 4, wherein the gate voltage signal is 33 V.

* * * * *